United States Patent [19]

Fujimori et al.

[11] Patent Number: 5,064,252
[45] Date of Patent: Nov. 12, 1991

[54] BRAKE FLUID PRESSURE CONTROLLER

[75] Inventors: Fumio Fujimori, Anjo; Masayoshi Tanikawa; Takashi Nagashima, both of Aichi; Kiyonobu Nagamori, Kariya; Hideo Onuki, Chiryu, all of Japan

[73] Assignees: Aisin Seiki Kabushiki Kaisha; Toyota Jidosha Kabushiki Kaisha, both of Aichi, Japan

[21] Appl. No.: 496,267

[22] Filed: Mar. 20, 1990

[30] Foreign Application Priority Data

Mar. 21, 1989 [JP] Japan .................. 1-31706[U]

[51] Int. Cl.$^5$ .................. B60T 8/26; F16K 15/14
[52] U.S. Cl. .................. 303/9.73; 303/9.75; 137/852; 188/349
[58] Field of Search .................. 303/9.62, 9.73, 9.75, 303/9.72, 9.71; 137/110, 852–854; 188/349

[56] References Cited

U.S. PATENT DOCUMENTS

| | | | |
|---|---|---|---|
| 3,315,469 | 4/1967 | Stelzer | 303/9.73 |
| 3,459,000 | 8/1969 | Oberthür | 303/9.73 X |
| 3,836,204 | 9/1974 | Van Wicklin, Jr. | 303/9.73 |
| 4,761,041 | 8/1988 | Nagashima et al. | 303/9.62 |

FOREIGN PATENT DOCUMENTS 50-9949 4/1975 Japan .

Primary Examiner—Douglas C. Butler
Assistant Examiner—Alfred Muratori
Attorney, Agent, or Firm—Burns, Doane, Swecker & Mathis

[57] ABSTRACT

A brake fluid pressure controller is interposed between a master cylinder and the rear wheel cylinders. The controller comprises a housing having an inlet, an outlet and a chamber which provides communication between the inlet and the outlet. An annular sealing member is disposed around a piston in the chamber with a clearance left therebetween. The sealing member has an inner perimeter defining a valve seat and an outer perimeter defining a flexible lip portion which is in contact with the internal wall of the chamber. When a valve head of the piston sits on the valve seat of the sealing member, the inner perimeter of the valve seat cuts off the communication between the inlet and the outlet. Meanwhile, the outer perimeter permits a communication from the outlet to the inlet but shuts off a communication from the inlet to the outlet. A spring urges the piston to a direction in which the valve head separates from the valve seat. A regulating member contacts the inner perimeter of the sealing member in the chamber from a side opposite to the valve head. The regulating member regulates the sealing member from moving in a direction from the valve head toward the regulating member.

7 Claims, 2 Drawing Sheets

BRAKE FLUID PRESSURE CONTROLLER

The present invention relates generally to fluid pressure controllers for hydraulic brakes in automobiles. Specifically, it relates to controllers that reduce the fluid pressure in the rear wheel cylinders of hydraulic brakes to a pressure that is at a substantially fixed ratio as compared to the master cylinder fluid pressure whenever the fluid pressure in the rear wheel cylinders of the hydraulic brakes is higher than a predetermined value.

BACKGROUND OF THE INVENTION

A conventional control for distributing brake forces between the front and rear wheels is, for example, described in Japanese Patent Publication No. 50-9949, which claims the priority of U.S. patent application Ser. No. 532,471 filed Mar. 7, 1966, now U.S. Pat. No. 3,423,936. The distribution control is carried out by a brake fluid pressure control valve. The control valve comprises a housing and a piston positioned in the housing. The housing includes a stepped cylindrical chamber with a large diameter portion and a small diameter portion communicating with the larger diameter portion. A master cylinder port and a rear wheel cylinder port are formed on the housing. Both the ports communicate with the large and small diameter portions of the cylindrical chamber, respectively.

A seal made of flexible material is disposed adjacent to the small diameter portion between the piston and the large diameter portion. The seal comprises an annular base portion and an annular lip portion. A plurality of radial ribs are formed on a first end surface of the base portion. The ribs have a semi-circular section. The base portion also has a plurality of axial ribs of semi-circular section provided on its outer peripheral surface. The seal is adapted to be placed at a prescribed position in the large diameter portion of the cylindrical chamber, namely, at a position where the ribs of the base portion contact the internal wall of the large diameter portion as well as an end wall or a shoulder between the large diameter portion and the small diameter portion. The annular base portion defines a valve seat at its inner perimeter adjacent to the small diameter portion of the cylinder chamber. The lip portion touches the internal wall of the large diameter portion of the chamber. The lip permits the brake fluid to pass between an outer perimeter and the first end surface of the base portion and the internal wall and end wall of the large diameter portion, thereby flowing from the small diameter portion to the large diameter portion. However, the lip portion prevents the reverse flow of the fluid.

The piston passes through the inner perimeter of the base portion of the seal with a clearance left therebetween. The piston bears the fluid pressure of the rear wheel cylinders at a first end positioned adjacent to the seal. The opposite end thereof (i.e., the second end) is slidably inserted in a sealed space. The piston has a valve head and a shoulder. The valve head moves back and forth relative to the seat between a seated position and an unseated position in accordance with the fluid pressure. Likewise, the step alternately contacts and is separated from a plurality of protrusions formed on the second end surface of the seal. A spring biases the valve head away from the valve seat.

When the brake fluid pressure control valve as constructed above is operated, the valve head of the piston is normally held away from the valve seat at a predetermined position. When the fluid pressure in the rear wheel cylinder reaches a predetermined level, the fluid pressure in the rear wheel cylinder is equal to the fluid pressure in the master cylinder. When the fluid pressure in the rear wheel cylinder exceeds the predetermined level, the piston is displaced such that the valve head sits on the valve seat. Then, the piston reciprocates in accordance with an increase in the fluid pressure in the master cylinder, whereby the valve head repeatedly sits on and separates from the valve seat. As a result, the fluid pressure in the rear wheel cylinder is controlled in accordance with the following equation.

$$PW = (1 - SS/SL)PM + F/SL$$

where
PW: Fluid pressure in the rear wheel cylinder
PM: Fluid pressure in the master cylinder
SS: Sectional area of the second end of the piston
SL: Area of a circle having a diameter equal to a sealing diameter defined by contact of the valve head with the valve seat
F: Load of the spring when the valve head sits on the valve seat In the above described device, the seal is held in a fixed position in the cylinder chamber. However, when the valve head sits on the valve seat, the flexible seal has its protrusions separated from the step of the piston. In this position, the axial movement of the seal toward the small diameter portion is regulated by the engagement of the radial ribs with the shoulder of the cylinder chamber. However, the seal has its axial movement toward the large diameter portion prevented only by a portion of the annular lip corresponding to its interference. That is, the free end of the lip that contacts the internal wall of the large diameter portion holds the seal in order to retain it at the fixed position in the large diameter portion of the cylinder chamber. Thus, the seal is in a floating state. In other words, the flexible seal is in an unstable state in which it may move dependent on the fluid pressure differential between the rear wheel cylinder and the master cylinder. Therefore, anytime there is a rapid change (rapid increase or decrease) in the fluid pressure in the master cylinder, the seal may move in an axial direction away from the fixed position. In this case, there is no problem if the seal moves axially in accordance with the change of the fluid pressure. However, since the seal is in the unstable state as mentioned above, it cannot accurately follow the change of the pressure difference nor move smoothly in the axial direction. Therefor, it is possible that the seal will be slanted relative to the axis of the cylinder and therefore, unable to fully perform its function. As a result, the fluid pressure in the system will be unevenly divided.

This problem may be solved by providing sufficient interference to the axial ribs of the seal. However, if the axial ribs are not molded to the same size, the dimensions of the valve seat vary which will again cause uneven pressure distribution.

SUMMARY OF THE INVENTION

Accordingly, it is a primary object of the present invention to provide a brake fluid pressure controller having a seal which is capable of stable movement.

To achieve the foregoing and other objects and in accordance with the purpose of the present invention, a novel brake fluid pressure controller is disclosed that comprises a housing having an inlet, an outlet and a chamber which provides communication between the inlet and the outlet. A piston is arranged in the chamber and has a valve head positioned between the inlet and the outlet. An annular sealing member is disposed between an internal wall of the chamber and the piston. The sealing member has its outer perimeter formed with a lip portion which is in contact with the internal wall of the chamber. The sealing member has its inner perimeter formed with a valve seat on which the valve head of the piston sits. When the valve head sits on the valve seat, the inner perimeter cuts off the communication from the inlet to the outlet, and the outer perimeter permits communication from the outlet to the inlet but shuts off communication from the inlet to the outlet. A spring urges the piston in the chamber to a direction in which the valve head is separated from the valve seat. A regulating member contacts the inner perimeter of the sealing member in the chamber from a side opposite to the valve head. The regulating member regulates the movement of the sealing member in a direction from the valve head toward the regulating member.

BRIEF DESCRIPTION OF THE DRAWINGS

The features of the present invention that are believed to be novel are set forth with particularity in the appended claims. The invention, together with further objects and advantages thereof, may best be understood by reference to the following description taken in conjunction with the accompanying drawings in which like elements bear like reference numerals and wherein:

DETAILED DESCRIPTION OF THE PREFERRED EMBODIMENTS

Figure 1:
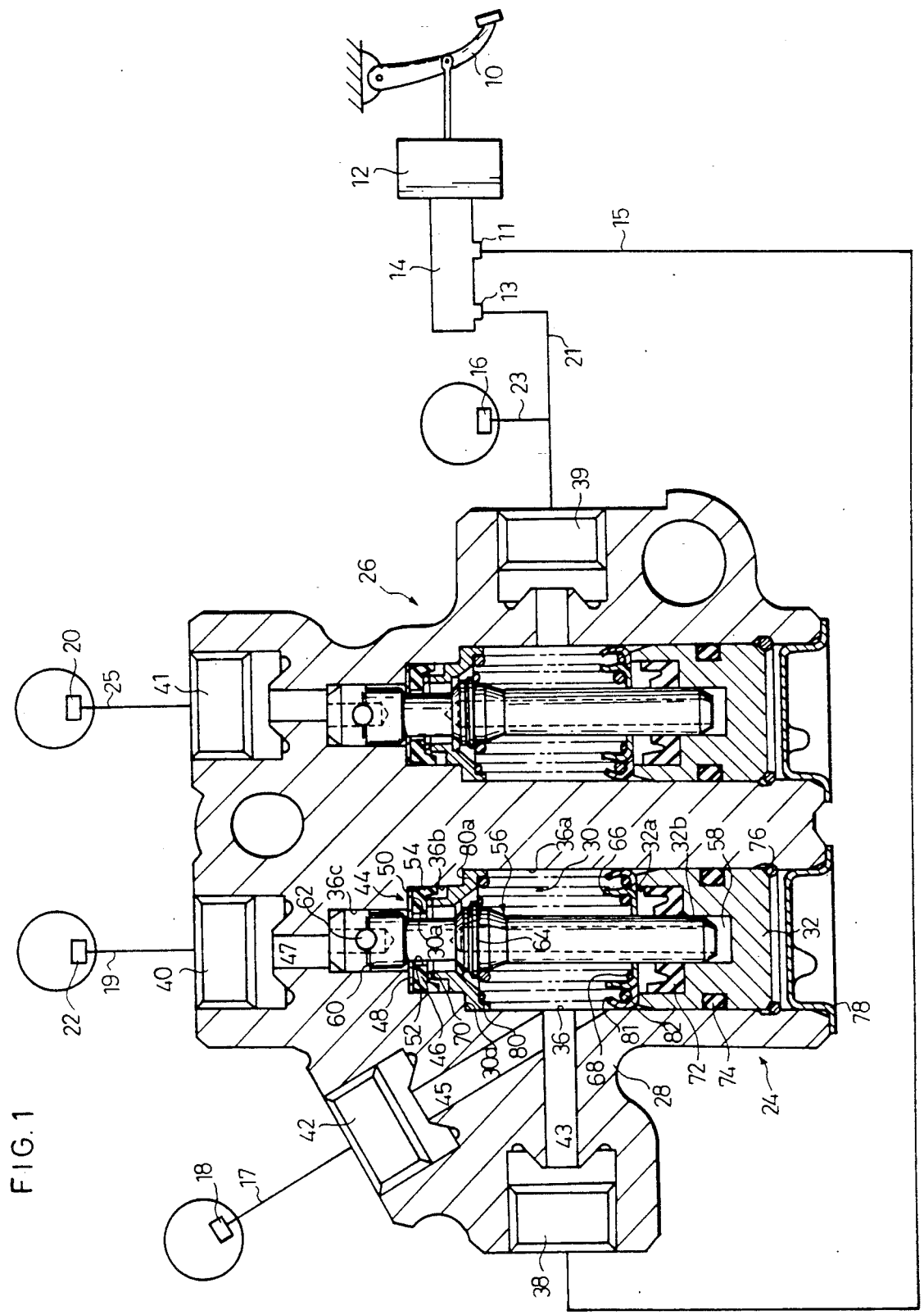
FIG. 1 is a cross sectional view showing an embodiment of a brake fluid pressure controller constructed in accordance with the present invention.

As illustrated in the drawings, the present invention is directed towards a brake fluid pressure controller. An embodiment of the invention is shown in FIG. 1.

A brake pedal 10 is operatively associated with a tandem master cylinder 14 via a brake booster 12. An outlet 11 is connected to a front wheel cylinder 18 via a conduit 15, a housing 28 and a conduit 17. The outlet 11 is also connected to a rear wheel cylinder 22 via the conduit 15, the housing 28 and a conduit 19. Another outlet 13 of the master cylinder 14 is connected to a front wheel cylinder 16 through conduits 21 and 23. The outlet 13 is also connected to a rear wheel cylinder 20 by the conduit 21, housing 28 and a conduit 25. The housing 28 constitutes a part of the controller of this embodiment.

The housing 28 has a master cylinder port 38 which is connected to the conduit 15 and a first rear wheel cylinder port 40 which is connected to the conduit 19. A first brake fluid pressure control valve 24 is arranged between both the ports 38 and 40, and supplies pressurized fluid from the master cylinder 14 to the rear wheel cylinder 22 while controlling the pressure. The rear wheel cylinder 22 operates according to the controlled pressure of the pressurized fluid supplied from the control valve 24. A front wheel cylinder port 42 is formed on the housing 28 and connects to the conduit 17. The ports 38 and 42 communicate with each other through passages 43 and 45 so that the pressurized fluid is supplied from the master cylinder 14 directly to the front wheel cylinder 18.

The housing 28 is also provided with a second master cylinder port 39 connected to the conduit 21 and a second rear wheel cylinder port 41 connected to the conduit 25. A second pressure control valve 26 is disposed between both the ports 39 and 41. The first and second control valves 24 and 26 have the same structure, and consequently, only one valve 24 will be described hereafter and the description of the other valve 26 will be omitted.

The brake fluid pressure control valve 24 comprises a stepped cylinder bore 30 formed in the housing 28. A plug 32 is inserted into a bottom opening of the cylinder bore 30 and prevented from coming out of the bore 30 by a snap ring 76. A stepped cylinder chamber 36 is defined by the internal wall of the cylinder bore 30 and the upper surface of the plug 32. The chamber 36 comprises a large diameter portion 36a, a medium diameter portion 36b stepped to the large diameter portion 36a via a first stepped portion 30d, and a small diameter portion 36c stepped to the medium diameter portion 36b via a second stepped portion 30a. The large diameter portion 36a communicates with the master cylinder port 38 through the passage 43. The small diameter portion 36c communicates with the rear wheel cylinder port 40 through a passage 47. Pressurized fluid enters the cylinder chamber 36 from the master cylinder 14.

The plug 32 has a relatively large diameter recess 32a formed in the upper end thereof, and a relatively small diameter blind hole 32b formed at the center of the bottom of the recess 32a. A seal 74 is fitted over the outer periphery of the plug 32 and prevents leakage of the brake fluid from the cylinder chamber 36. A cover 78 is attached to the bottom opening of the cylinder bore 30 and prevents the entrance of foreign matter like water from outside into the cylinder chamber 36.

Figure 2:
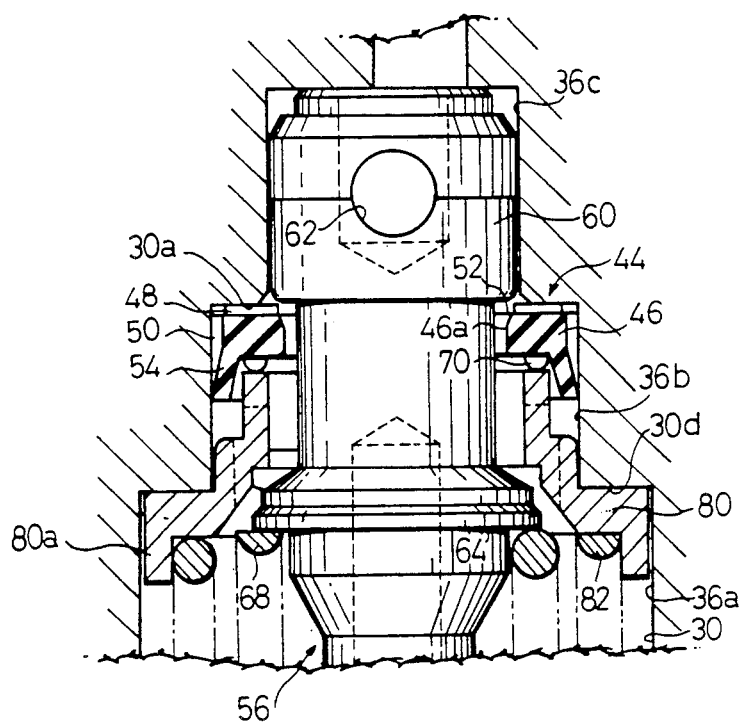
FIG. 2 is a cross sectional view showing a main part of the embodiment.

A sealing member 44, made of a known flexible material like rubber, is fitted in the medium diameter portion 36b of the chamber 36. As shown in FIG. 2, the sealing member 44 has an annular base portion 46 and an annular lip portion 54 which hangs vertically downward from the base portion 46. The base portion 46 has a circular inner peripheral surface 46a positioned concentrically with respect to the hole 32b of the plug 32. A valve seat 52 is defined by the upper edge of the inner peripheral surface 46a. The base portion 46 has its upper end surface provided with a plurality of radial ribs 48 each having substantially a trapezoidal cross section and extending in the radial direction. The radial ribs 48 abut the second stepped portion 30a of the cylinder chamber 36. The base portion 46 has its outer peripheral surface provided with a plurality of axial ribs 50 each having substantially a trapezoidal cross section and extending in the axial direction. The axial ribs 50 abut the internal wall of the medium diameter portion 36b of the cylinder chamber 36. Both of the ribs 48 and 50 reinforce the sealing member 44. The base portion 46 has its lower end surface formed with a plurality of semispherical protrusions 70 so as to be placed at fixed intervals in the circumferential direction.

The annular lip portion 54 touches the internal wall of the medium diameter portion 36b of the chamber 36. The lip portion 54 permits the brake fluid to flow from the small diameter portion 36c to the large diameter portion 36a in the chamber 36, along the upper end surface and the outer peripheral surface of the base portion 46 of the sealing member 44. However, it prevents the reverse flow of the brake fluid.

A piston 56 is positioned in the cylinder chamber 36. The piston 56 passes through the inner peripheral surface 46a of the sealing member 46 while leaving a space relative thereto. A valve head 60 is arranged at the upper end of the piston 56 and is slidably inserted in the small diameter portion 36c of the chamber 36. The valve head 60 is adapted to sit on and to be separated from the valve seat 52 of the sealing member 44. A clearance is provided between the outer perimeter of the valve head 60 and the internal wall of the small diameter portion 36c. The valve head 60 has an inner passage 62. The passage 62 communicates the cylinder chamber 36 with the rear wheel cylinder port 40 via the clearance so as to allow the brake fluid to pass therebetween. The lower end of the piston 56 is slidably inserted in the hole 32b of the plug 32. An air chamber 58 is defined between the lower end surface of the piston 56 and the internal wall of the hole 32b. A seal 72 is fitted over the outer periphery of the piston 56 in the recess 32a of the plug 32 and prevents the brake fluid from intruding into the air chamber 58.

The piston 56 has a flange 64 formed at a middle part thereof. A first spring retainer 66 is disposed on the upper end surface of the plug 32 around the piston 56. A first spring 68 is interposed between the flange 64 on the piston 56 and the retainer 66 and urges the piston 56 usually in the direction in which the valve head 60 separates from the valve seat 52. Accordingly, when the piston 56 is in an unoperated state it assumes the position illustrated in FIG. 1 in which its upper end touches the upper wall of the small diameter portion 36c of the cylinder chamber 36.

A regulating member 80 is arranged in the internal walls of the cylinder chamber 36 from the large diameter portion 36a to the medium diameter portion 36b. A second spring retainer 81 is disposed on the upper end surface of the plug 32 around the first retainer 66. A second spring 82 is interposed between the regulating member 80 and the retainer 81 and urges the regulating member 80 upward. Thereby, the regulating member 80 has its upper end surface always held in contact with the protrusions 70 of the sealing member 44. A shoulder 80a of the regulating member 80 abuts usually on the first stepped portion 30d of the cylinder chamber 36.

The brake fluid pressure controller constructed in the above-described manner operates as follows in addition to the action similar to the device disclosed in Japanese Patent Publication 50-9949. That is, when the pressure in the rear cylinders 20, 22 is below the pressure of the master cylinder 14, a compressive load is applied to the sealing member 44 in the axial direction by the pressure differential between the master cylinder fluid pressure and the fluid pressure in the rear cylinders. In this case, the radial and axial ribs 48 and 50 support the load so as to prevent deformation of the sealing member 44 by the compression. Thus, the diameter of the valve seat 52 of the sealing member 44 does not vary. Accordingly, uneven pressure distributions do not occur.

Moreover, when a downward force larger than the force of the first spring 68 is applied to the piston 56 by the pressurized fluid from the master cylinder 14, the valve head 60 sits on the valve seat 52 in the same manner as the device of Japanese Patent Publication No. 50-9949. In this state, the piston 56 moves upward and downward in the chamber 36 in accordance with changes in the pressure differential between the rear wheel cylinder and the master cylinder.

When the piston 56 is moved downward by the fluid pressure differential between both of the cylinders, the valve head 60 usually slides on the inner peripheral surface 46a of the sealing member 44. Hereupon, the second spring 82 urges the sealing member 44 upward by way of the regulating member 80 and the protrusions 70, in addition to the pressure to the internal surface of the sealing member by the master cylinder fluid. Thus, the sealing member 44 is held in the fixed position even if the piston 56 moves downward rapidly under the influence of a rapid change in the fluid pressure differential. If the sealing member 44 was to follow the piston 56 and move downward through engagement with the valve head 60, the sealing member 44 would float as in the case of the prior art. However, in accordance with this embodiment of the present invention, the regulating member 80 supports the sealing member 44 against downward movement, via the action of the second spring 82. Namely, the sealing member is held from upper and lower sides by the valve head 60 and the regulating member 80. Therefor, even if the sealing member 44 moves in the axial direction, it can smoothly follows the movement of the piston 56. Thus, the sealing member moves downward while being kept in a stable state without any inclination relative to the axis of the cylinder chamber 36.

Moreover, when the piston 56 is moved upward by the fluid pressure differential between the cylinders, the sealing member 44 follows the movement of the piston 56 and moves smoothly in the axial direction, by the action of the second spring 82. Accordingly, if the fluid pressure differential between the cylinders changes rapidly and the piston moves swiftly, the sealing member 44 does not bring forth any inclination or the like by an unstable movement. It is stably retained and fully performs its functions to the full. As a result, the fluid pressure control characteristic is kept stable, so that the following ability of the control valves 24 and 26 improves with respect to a rapid braking action.

Figure 3:
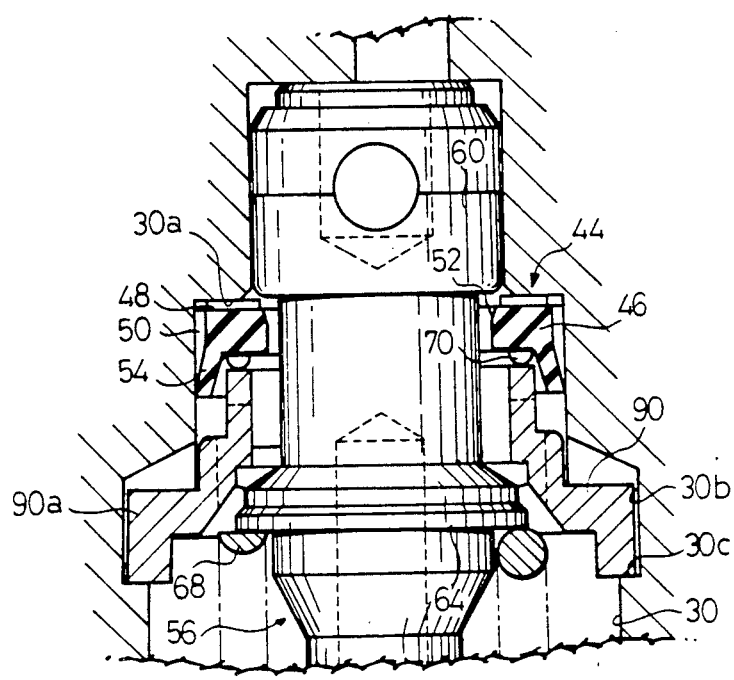
FIG. 3 is a cross sectional view showing a main part of a modified controller.

FIG. 3 illustrates a modified controller of the present invention. In this modification, an inner groove 30b is formed in the cylinder bore 30 or at the large diameter portion of the cylinder chamber 36. A regulating member 90 is snapped and fitted into the inner groove 30b. The regulating member 90 has its outer perimeter provided with slits (not shown) which extend in the axial direction. The regulating member 90 is accommodated in the groove 30b while flexibly deforming the protrusions 70 by contacting its upper end therewith. The upper end of the regulating member 90 is kept in contact with the protrusions 70 of the sealing member 44, while its shoulder 90a contacts the stepped portion 30c of the inner groove 30b, as a result of the flexibility of the protrusions 70. Thus, the sealing member 44 always touches the upper end of the regulating member 90 via the protrusions 70, so that it occupies the fixed position in the chamber 36. As a result, the sealing member 44 is prevented from unstable movement in this embodiment as in the previously described embodiment.

Although only a few embodiments of the present invention have been described herein, it should be understood that the present invention may be embodied in many other specific forms without departing from the spirit or scope of the invention. For example, the protrusions of the sealing member and the upper end of the regulating member may be joined or integrally molded as far as the communication of the brake fluid is assured therebetween.

Further, the shape of the sealing member or the regulating member or the other structures may be varied in accordance with the teachings herein. Therefore, the present embodiments are to be considered as illustrative and not restrictive, and the invention is not limited to the details given herein, but may be modified within the scope of the appended claims.

We claim:

1. A brake fluid pressure controller comprising:
   a housing having an inlet, an outlet and a chamber which communicates the inlet with the outlet;
   a piston arranged in the chamber, the piston having a longitudinal axis and a valve head positioned between the inlet and the outlet;
   an annular sealing member disposed between an internal wall of the chamber and the piston, the sealing member having a plurality of elastic protrusions on a first surface thereof that face away from the valve head;
   a lip portion formed on an outer perimeter of the sealing member and being in contact with the internal wall of the chamber;
   a valve seat formed on a second surface of the sealing member and adapted to receive the valve head of the piston;
   the sealing member being arranged such that when the valve head is pressed against the valve seat, the valve seat cuts off a first communication path between the inlet and the outlet, and the lip portion permits a communication from the outlet to the inlet but shuts off a communication from the inlet to the outlet along a second communication path;
   a spring arranged in the chamber for urging the piston in a direction in which the valve head is separated from the valve seat; and
   a regulating member disposed in the chamber for engagement with the protrusions on the sealing member, the regulating member being arranged to engage the wall of the chamber to regulate a load applied to the protrusions and thereby regulate movement of the sealing member in a direction longitudinally of the piston.

2. A brake fluid pressure controller according to claim 1, further comprising a second spring disposed in the chamber and urging the regulating member toward the sealing member.

3. A brake fluid pressure controller comprising:
   a housing having an inlet, an outlet and a chamber which communicates the inlet with the outlet, the chamber having a groove therein;
   a piston arranged in the chamber, the piston having a valve head positioned between the inlet and the outlet;
   an annular sealing member disposed between an internal wall of the chamber and the piston;
   a lip portion formed on an outer perimeter of the sealing member for contacting the internal wall of the chamber;
   a valve seat formed on a first inner surface of the sealing member and adapted to receive the valve head of the piston;
   the sealing member being arranged such that when the valve head is pressed against the valve seat, the valve seat cuts off a first communication path between the inlet and the outlet, and the lip portion permits a communication from the outlet to the inlet but shuts off a communication from the inlet to the outlet along a second communication path;
   a spring arranged in the chamber for urging the piston in a direction in which the valve head is separated from the valve seat; and
   a regulating member disposed in the chamber for contacting a second inner surface of the sealing member from a side opposite to the valve head, the regulating member being arranged to regulate the movement of the sealing member in a direction from the valve head toward the regulating member, the groove being adapted to accommodate part of the regulating member, and wherein the regulating member is immovably fixed by collaboration of the sealing member and the groove while being in contact with the sealing member.

4. A brake fluid pressure controller as recited in claim 1, wherein the chamber includes a first step and the regulating member includes a shoulder arranged to abut against said first step to regulate the load applied to the sealing member.

5. A brake fluid pressure controller as recited in claim 4, wherein the regulating member is journaled about the piston and includes a narrow diameter portion arranged to engage the protrusions and a large diameter portion that includes the shoulder.

6. A brake fluid pressure controller as recited in claim 5, wherein the chamber further includes a groove that receives the large diameter portion of the regulating member to fix the regulating member and the sealing member in place.

7. A brake fluid pressure controller as recited in claim 5, further comprising a second spring that engages the large diameter portion to push the regulating member against the sealing member.

* * * * *